(12) United States Patent
Pai et al.

(10) Patent No.: US 6,770,984 B2
(45) Date of Patent: Aug. 3, 2004

(54) ELECTRONIC VOLTAGE REGULATOR WITH SWITCHING CONTROL DEVICE AND CONTROL METHOD FOR STABILIZING OUTPUT VOLTAGE

(75) Inventors: Fu-Sheng Pai, Tainan (TW); Ming-Tsung Tsai, Tainan (TW)

(73) Assignee: Delta Electronics Inc., Taoyuan (TW)

( * ) Notice: Subject to any disclaimer, the term of this patent is extended or adjusted under 35 U.S.C. 154(b) by 21 days.

(21) Appl. No.: 10/230,126

(22) Filed: Aug. 28, 2002

(65) Prior Publication Data

US 2003/0043596 A1 Mar. 6, 2003

(30) Foreign Application Priority Data

Aug. 28, 2001 (TW) .......................... 90121231 A
Nov. 19, 2001 (TW) .......................... 90128630 A (51) Int. Cl.[7] .................................. H02J 1/12
(52) U.S. Cl. ............................ 307/46; 307/66
(58) Field of Search ........................ 307/46, 64, 66, 307/85, 86, 87

(56) References Cited

U.S. PATENT DOCUMENTS 4,297,614 A * 10/1981 Chandler ................... 315/86
5,440,179 A * 8/1995 Severinsky ................. 307/66

* cited by examiner

*Primary Examiner*—Shawn Riley
(74) *Attorney, Agent, or Firm*—Volpe and Koenig, P.C.

(57) ABSTRACT

The proposed voltage regulator has a power converter, a switch, a transformer, and a switching control device. The power converter is electrically connected to a power source for providing a voltage to compensate the output voltage of the voltage regulator when the output voltage is higher or lower than a predetermined level. The transformer is electrically connected to the switch for being used as a variable voltage source and the connecting configuration of the switch is determined by the input voltage. Also, the switching control device is electrically connected to the power converter for causing the voltage to have a phase shift with the input voltage and the inner product of the voltage and the input current being a positive value. The proposed control method is employed for generating a compensation voltage to stabilize the output voltage of the voltage regulator.

27 Claims, 7 Drawing Sheets

Fig. 1(a)

(PRIOR ART)

Fig. 1(b)

(PRIOR ART)

Fig. 2(a)

(PRIOR ART)

Fig. 2(b)

(PRIOR ART)

ELECTRONIC VOLTAGE REGULATOR WITH SWITCHING CONTROL DEVICE AND CONTROL METHOD FOR STABILIZING OUTPUT VOLTAGE

FIELD OF THE INVENTION

The present invention generally relates to the field of voltage regulators, and especially relates to an uninterruptible power supply.

BACKGROUND OF THE INVENTION

Figure 1A:
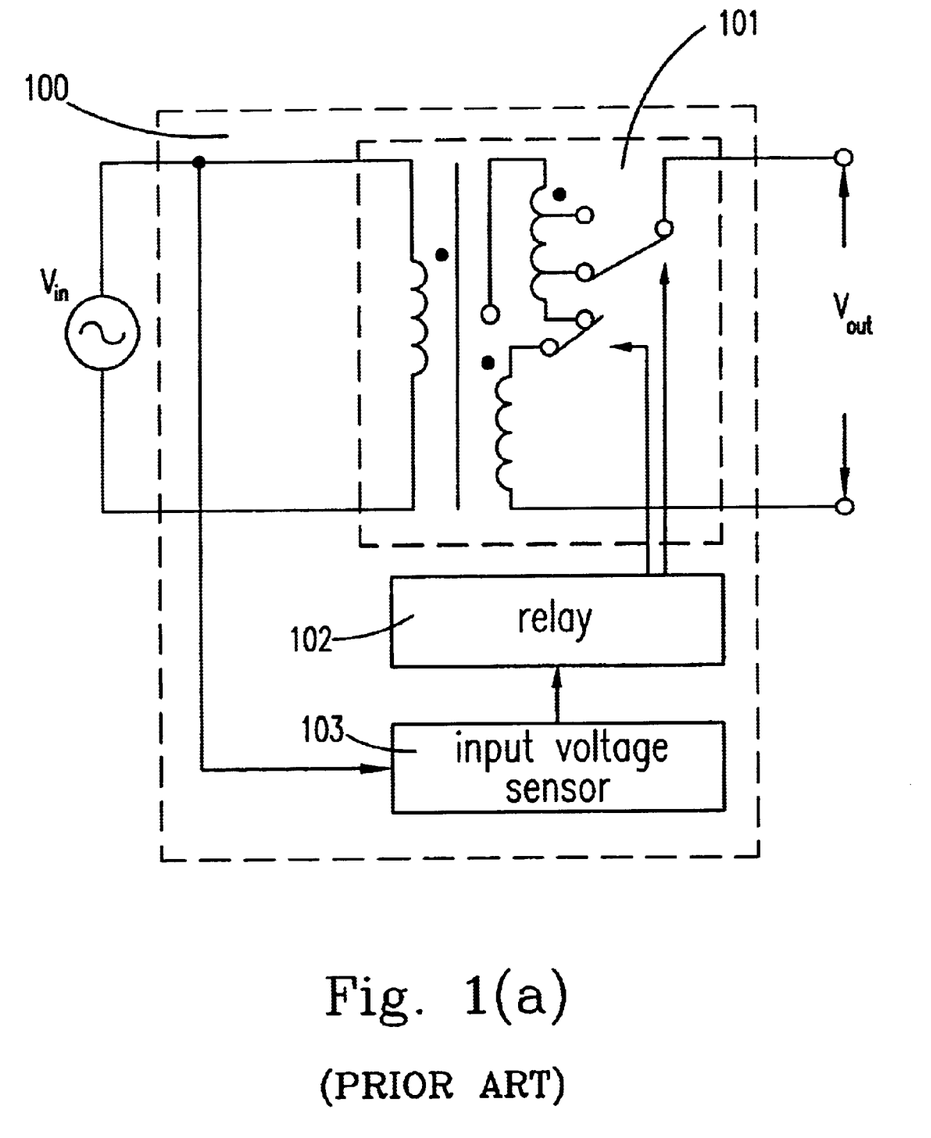
FIG. 1(a) is a schematic diagram illustrating an isolated type of a mechanical regulator according to the prior art.

Please refer to FIG. 1(a) which is a schematic diagram illustrating an isolated type of a mechanical regulator according to the prior art. As shown in FIG. 1(a), the isolated type of a mechanical voltage regulator 100 includes an isolated transformer 101, a relay 102, and an input voltage sensor 103. The input voltage sensor 103 is used to sense the input voltage $V_{in}$, and then a trigger signal is generated thereby in order to actuate the relay 102. Accordingly, the turn ratio of the isolated transformer 101 can be adjusted by turning on and off the relay 102. By the adjustment of the turn ratio, the output voltage $V_{out}$ can be stabilized at a predetermined level.

Figure 1B:
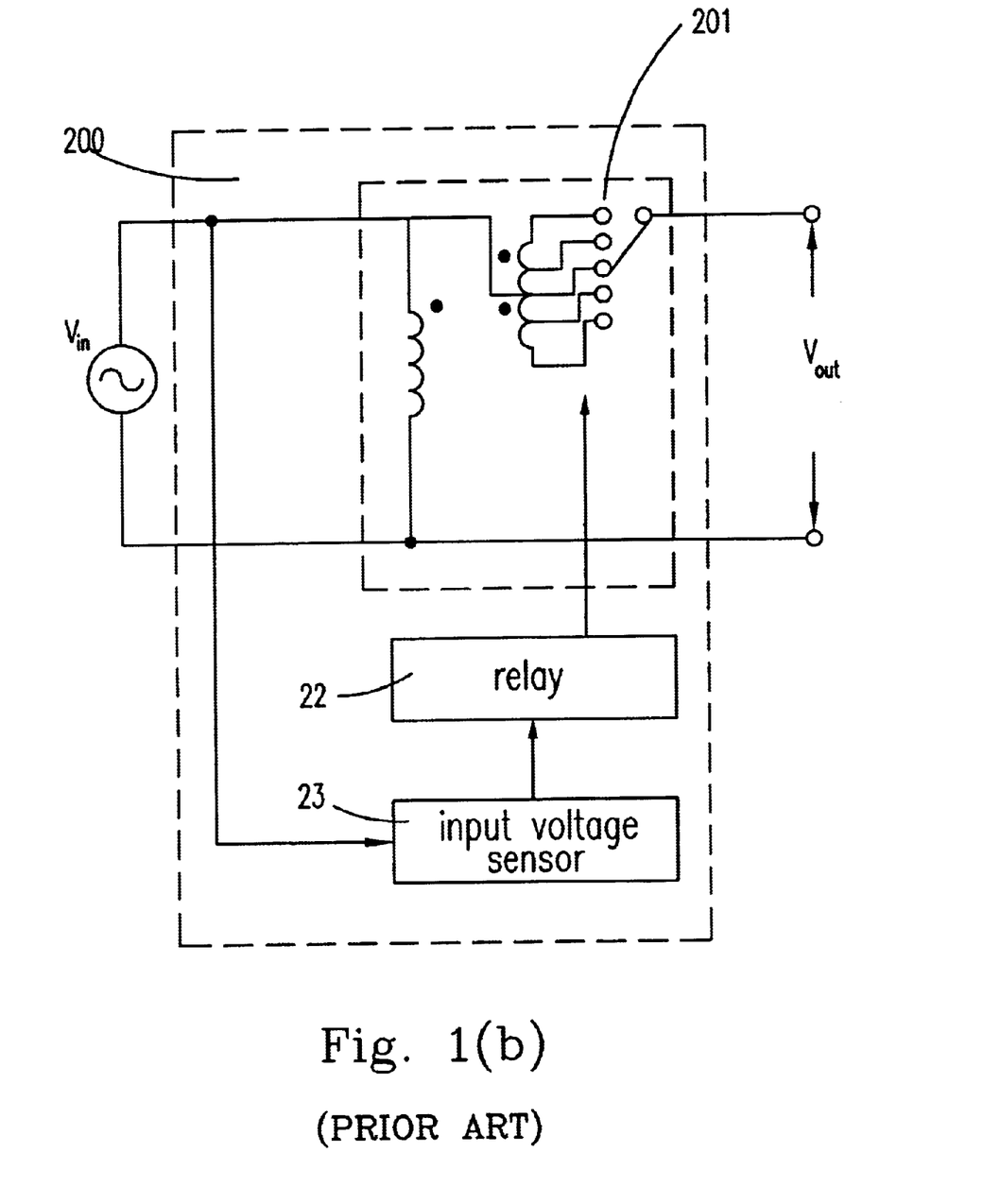
FIG. 1(b) is a schematic diagram illustrating a non-isolated type of a mechanical regulator according to the prior art.

Please refer to FIG. 1(b) is a schematic diagram illustrating a non-isolated type of a mechanical voltage regulator according to the prior art. As shown in FIG. 1(b), the non-isolated type of a mechanical regulator 200 includes a non-isolated transformer 201, a relay 202, and an input voltage sensor 203. The input voltage sensor 203 is used to sense the input voltage $V_{in}$, and then a trigger signal is generated thereby in order to actuate the relay 202. Accordingly, the turn ratio of the isolated transformer 201 can be adjusted by turning on and off the relay 202. By the adjustment of the turn ratio, the output voltage $V_{out}$ can be stabilized at a predetermined level.

According to the aforementioned art, the employment of the tap-changing transformers 100, 200 was often adopted in stabilizing the system voltage at a customer side. By tuning the transformer taps to reach the expected turn ratio, the input voltage can be boosted or reduced to meet the application need while the load voltage is maintained at a certain level. This strategy seems feasible, yet their speed response and voltage regulation are restricted to the use of mechanical tap changers. Moreover, the bulk volume of the transformer may deteriorate the system encasement, thereby affecting the cost of the system.

Figure 2A:
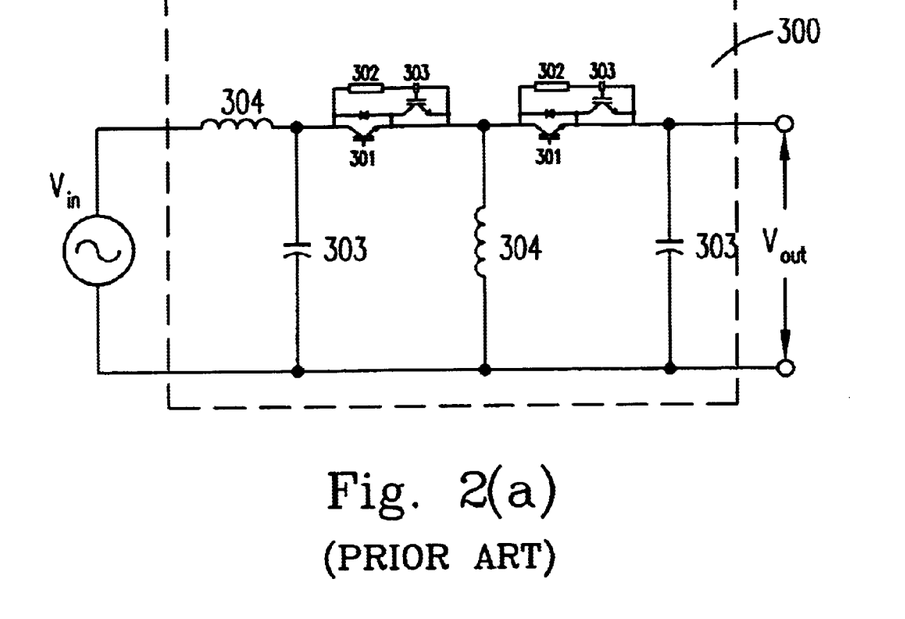
FIG. 2(a) is a schematic diagram illustrating in electronic voltage regulator according to the prior art.

Please refer to FIG. 2(a). FIG. 2(a) is a schematic diagram illustrating an electronic voltage regulator according to the prior art. As shown in FIG. 2(a), the electronic voltage regulator 300 consists of at least one electronic switch 301, at least one resistor 302, at least one capacitor 303, and at least one inductor 304. Also a high frequency electrical switching technique is employed in the electronic voltage regulator 300 to stabilize the output voltage $V_{out}$.

Figure 2B:
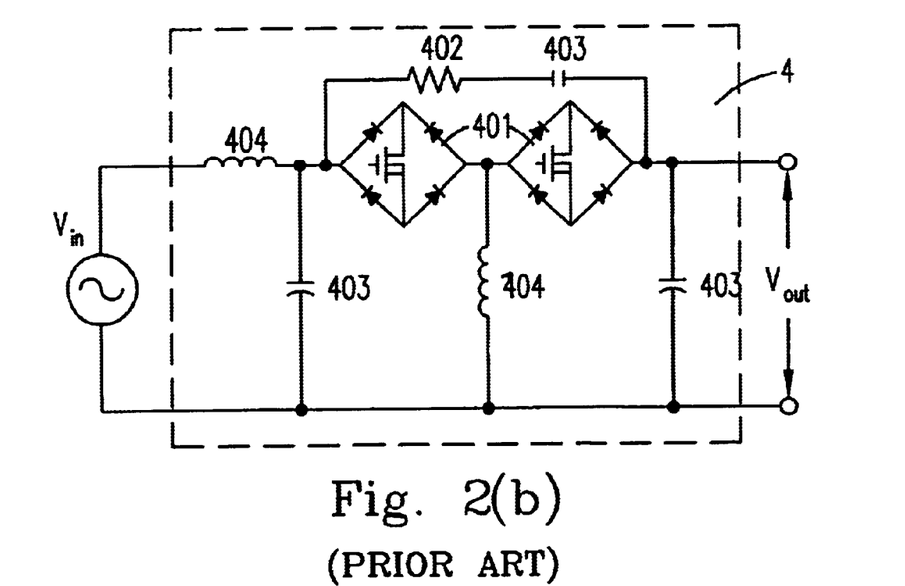
FIG. 2(b) is a schematic diagram illustrating another electronic voltage regulator according to the prior art.

Please refer to FIG. 2(b). FIG. 2(b) is a schematic diagram illustrating an electronic voltage regulator according to the prior art. As shown in FIG. 2(b), the electronic voltage regulator 400 consists of at least one electronic switch 401, at least one resistors 402, at least one capacitors 403, and at least one inductor 404. Also a high frequency electrical switching technique is employed in the electronic voltage regulator 300 to stabilize the output voltage $V_{out}$.

The conventional electronic voltage regulators employ the power transistors and inductors to regulate input energy and increase the circuit ability to stabilize the output voltage. However, in these cases there exist large voltage phase differences between the system input and output. An additional safety design for an I/O bypass circuit becomes difficult and may degrade the operational reliability of the system. Besides, it is also hard to expand the voltage regulators with the function of Uninterruptible Power Supplier (UPS) due to less possibility of embedding DC batteries in these systems. It is therefore attempted by the applicant to deal with the above situation encountered with the prior art.

SUMMARY OF THE INVENTION

It is therefore an object of the present invention to propose an electronic voltage regulator and a control method thereof. Especially, when the electronic voltage regulator further includes an energy storage device, the inventive voltage regulator can be used as an uninterruptible power supply.

According to an aspect of the present invention, the electronic voltage regulator includes input terminals electrically connected to an power source which provides an input voltage, output terminals for providing a stable output voltage, a power converter electrically connected to the power source for generating a DC voltage and then converting the DC voltage to generate a compensation voltage to compensate the output voltage when the output voltage is different from a predetermined value, a switch with a first terminal electrically connected to the power source, a transformer with a primary winding and a secondary winding, wherein a first terminal of the primary winding electrically connected to an output terminal of the power converter, a second terminal of the primary winding electrically connected to a second terminal of the output terminals, a first terminal of the secondary winding electrically connected to a first terminal of the output terminals, a second terminal of the secondary winding electrically connected to a second terminal of the switch, and a third terminal of the switch electrically connected to the first terminal of the primary winding, and a switching control device electrically connected to the power converter for controlling the power converter to stabilize the output voltage.

Preferably, the power source is an AC power.

Preferably, the electronic voltage regulator further includes a DC-DC converter electrically connected to the DC voltage for providing a transformation of the DC voltage.

Preferably, the electronic voltage regulator further comprises a energy storage device electrically connected to the DC-DC converter in which the electric energy of the DC voltage charges the energy storage device through the DC-DC converter when the input voltage is within a specific range, and the electric energy of the energy storage device is transformed to compensate the DC voltage when the input voltage is out of the specific range.

Preferably, the energy storage device is a battery.

Preferably, the electronic voltage regulator is an uninterruptible power supply (UPS).

Preferably, the DC voltage is a DC-Bus voltage.

Preferably, the transformer is a variable voltage source depending on a connection configuration of the switch.

Preferably, the switching control device controls the compensation voltage having a phase difference with the input voltage and thereby keep the compensating power to be a positive value.

Preferably, the connection configuration of the switch includes a first connection configuration in which the second terminal of the switch is electrically connected to the first terminal of the switch to form a conducting path when the input voltage is within a specific range, and a second connection configuration in which, the second terminal of the switch is electrically connected to the third terminal of the switch to form a conducting path when the input voltage is out of the specific range.

Preferably, the power converter further includes an output switch assembly electrically connected to the DC voltage for converting the DC voltage to provide the compensation voltage to stabilize the output voltage.

Preferably, the switching control device obtains one group of voltages and one group of phases by feedback of the input voltage, the output voltage, and the DC voltage and thereby a pulse width modulation (PWM) signal is generated through the output switch assembly to stabilize the output voltage.

Preferably, the switching control device includes a DC voltage sensor unit electrically connected to the DC voltage for sensing the DC voltage to generate a first signal according to a magnitude of the DC voltage, a first voltage compensator unit electrically connected to the DC voltage sensor for transforming the first signal to a second signal, an input voltage sensor unit electrically connected to the power source for sensing the input voltage to generate a third signal, a phase lock loop unit electrically connected to the input voltage sensor unit for sensing a phase of the third signal to generate a first phase signal, a phase shift unit electrically connected to the phase lock loop unit for processing 90° phase shift of the first phase signal to generate a second phase signal, a multiplier unit electrically connected to the an output terminal of the first voltage compensator unit and the phase shift unit for multiplying the second signal by the second phase signal to generate a fourth signal, an output voltage sensor unit electrically connected to the output voltage for sensing the output voltage to generate a fifth signal having a magnitude and a phase, a AC-to-DC converter unit electrically connected to the output voltage sensor unit for transforming the fifth signal to a sixth signal, a second DC voltage compensator unit electrically connected to the AC-to-DC converter unit for transforming the sixth signal to generate a seventh signal, a second multiplier unit electrically connected to the second DC voltage compensator unit for multiplying the seventh signal by the first phase signal to generate an eighth signal, an adder unit electrically connected to an output terminal of the first multiplier unit and an output terminal of the second multiplier unit for adding the fourth signal and the eighth signal to generate a command tracking signal, an AC command tracking control unit electrically connected to an output terminal of the adder unit and an output terminal of the output voltage sensor unit to compare the command tracking signal with the fifth signal to generate a trigger signal, and a PWM generator electrically connected to the AC command tracking control unit for transforming the trigger signal to a PWM signal, thereby driving the output switch assembly to provide the compensation voltage to stabilize the output voltage.

Preferably, the first signal, the second signal, the third signal, the sixth signal, and the seventh signal are DC signals.

Preferably, the fourth signal, the fifth signal, the eighth signal, and the command tracking signal are AC signals.

According another aspect of the invention, the control method applying an electronic voltage regulator which comprises input terminals electrically connected to an power source which provides an input voltage, output terminals for providing a stable output voltage, a power converter electrically connected to the power source for generating a DC voltage and providing a transformation of the DC voltage to generate a compensation voltage, a switch, a transformer electrically connected between the power converter, the switch, and output terminals, wherein the transformer is a variable voltage source to stabilize the output voltage depending on a connection configuration of the switch, including the steps of judging whether the output voltage is within a specific range, determining a connection configuration of the switch, generating the compensation voltage through the power converter and the transformer, controlling the compensation voltage having a phase difference with the input voltage and keeping the compensating power to be a positive value, and thereby utilizing the compensation voltage to stabilize the output voltage.

Preferably, the electronic voltage regulator further comprises a DC-DC converter electrically connected to the DC voltage for providing a transformation of the DC voltage.

Preferably, the electronic voltage regulator further comprises a energy storage device electrically connected to the DC-DC converter in which the electric energy of the DC voltage charges the energy storage device through the DC-DC converter when the input voltage is within a specific range, and the electric energy of the energy storage device is transformed to compensate the DC voltage when the input voltage is out of the specific range.

Preferably, the energy storage device is a battery.

Preferably, the electronic voltage regulator is an uninterruptible power supply (UPS).

Preferably, the connection configuration of the switch includes a first connection configuration in which the second terminal of the switch is electrically connected to the first terminal of the switch to form a conducting path when the output voltage is within a specific range, and a second connection configuration in which the second terminal of the switch is electrically connected to the third terminal of the switch to form a conducting path when the output voltage is out of the specific range.

According a further aspect of the invention, the electronic voltage regulator includes input terminals electrically connected to an power source which provides an input voltage, output terminals for providing a stable output voltage, a power converter electrically connected to the power source for generating a DC voltage and then converting the DC voltage to generate a compensation voltage to compensate the input voltage when the input voltage is different from a predetermined value, a switch with a first terminal electrically connected to the power source, a transformer with a primary winding and a secondary winding, wherein a first terminal of the primary winding electrically connected to an output terminal of the power converter, a second terminal of the primary winding electrically connected to a second terminal of the output terminals, a first terminal of the secondary winding electrically connected to a first terminal of the output terminals, a second terminal of the secondary winding electrically connected to a second terminal of the switch, and a third terminal of the switch electrically connected to the first terminal of the primary winding, and a switching control device electrically connected to the power converter for controlling the power converter to stabilize the output voltage.

Preferably, the electronic voltage regulator ether comprises a DC-DC converter electrically connected to the DC voltage for providing a transformation of the DC voltage.

Preferably, the electronic voltage regulator further includes a energy storage device electrically connected to the DC-DC converter in which the electric energy of the DC voltage charges the energy storage device through the DC-DC converter when the input voltage is within a specific range, and the electric energy of the energy storage device is transformed to compensate the DC voltage when the input voltage is out of the specific range.

Preferably, the energy storage device is a battery.

Preferably, the electronic voltage regulator is an uninterruptible power supply (UPS).

Preferably, the transformer is a variable voltage source depending on a connection configuration of the switch.

Preferably, the switching control device controls the compensation voltage having a phase difference with the input voltage and thereby keeps the compensating power to be a positive value.

Preferably, the connection configuration of the switch includes a first connection configuration in which the second terminal of the switch is electrically connected to the first terminal of the switch to form a conducting path when the input voltage is within the specific range, and a second connection configuration in which the second terminal of the switch is electrically connected to the third terminal of the switch to form a conducting path when the input voltage is out of the specific range.

Preferably, the power converter further comprises an output switch assembly electrically connected to the DC voltage for converting the DC voltage to provide the compensation voltage to stabilize the output voltage.

Preferably, the switching control device obtains one group of voltages and one group of phases by feedback of the input voltage, the output voltage, and the DC voltage and thereby a pulse width modulation (PWM) signal is generated through the output switch assembly to stabilize the output voltage.

The present invention may best be understood through the following description with reference to the accompanying drawings, in which:

DETAILED DESCRIPTION OF THE PREFERRED EMBODIMENT

Figure 3:
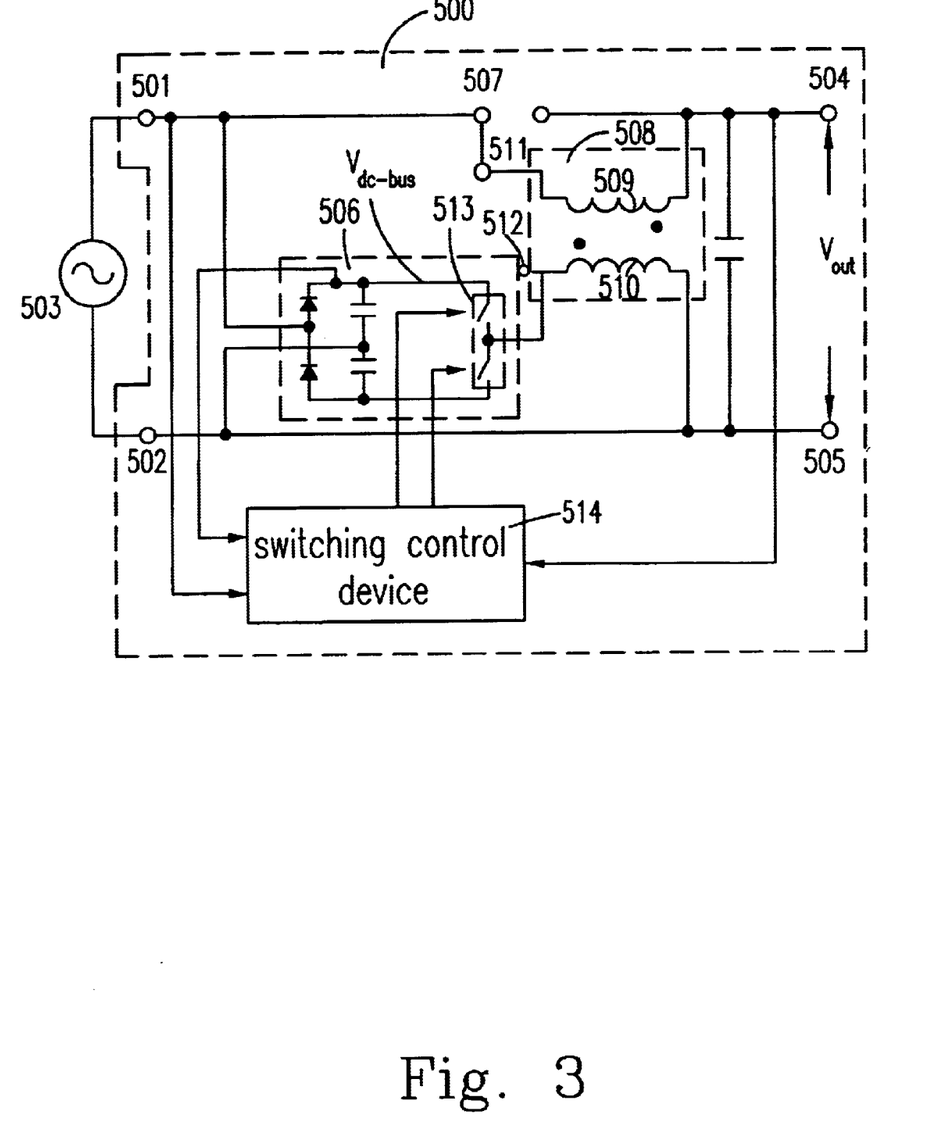
FIG. 3 is a schematic diagram illustrating an electronic voltage regulator according to a preferred embodiment of the present invention.

Please refer to FIG. 3. It is a schematic diagram illustrating an electronic voltage regulator according to a preferred embodiment of the present invention. As shown in FIG. 3, the electronic voltage regulator 500 includes input terminals 501, 502, output terminals 504, 505 for providing a stable output voltage $V_{out}$, a power converter 506, a switch, a transformer 508, and a switching control device 514. Input terminals 501, 502 are electrically connected to a power source 503 which provides an input voltage $V_{in}$. The power converter 506 are electrically connected to the power source 503 for generating a DC voltage $V_{dc-bus}$ and then converting the DC voltage $V_{dc-bus}$ to generate a compensation voltage to compensate the output voltage $V_{out}$ when the output voltage $V_{out}$ is different from a predetermined value. The switch has a first terminal 507 being electrically connected to the power source 503. The transformer 508 has a primary winding 510 and a secondary winding 509. Meanwhile, a first terminal of the primary winding 510 is electrically connected to an output terminal of the power converter 506. A second terminal of the primary winding 510 is, electrically connected to the second terminal 505 of the output terminals. A first terminal of the secondary winding 509 is electrically connected to a first terminal 504 of the output terminals. A second terminal of the secondary winding 509 is electrically connected to a second terminal 511 of the switch. And, a third terminal 512 of the switch is electrically connected to the first terminal of the primary winding 510. In addition, a switching control device 514 is electrically connected to the power converter 506 for controlling the power converter to stabilize the output voltage. Preferably, the power source is an AC power.

Figure 4A:
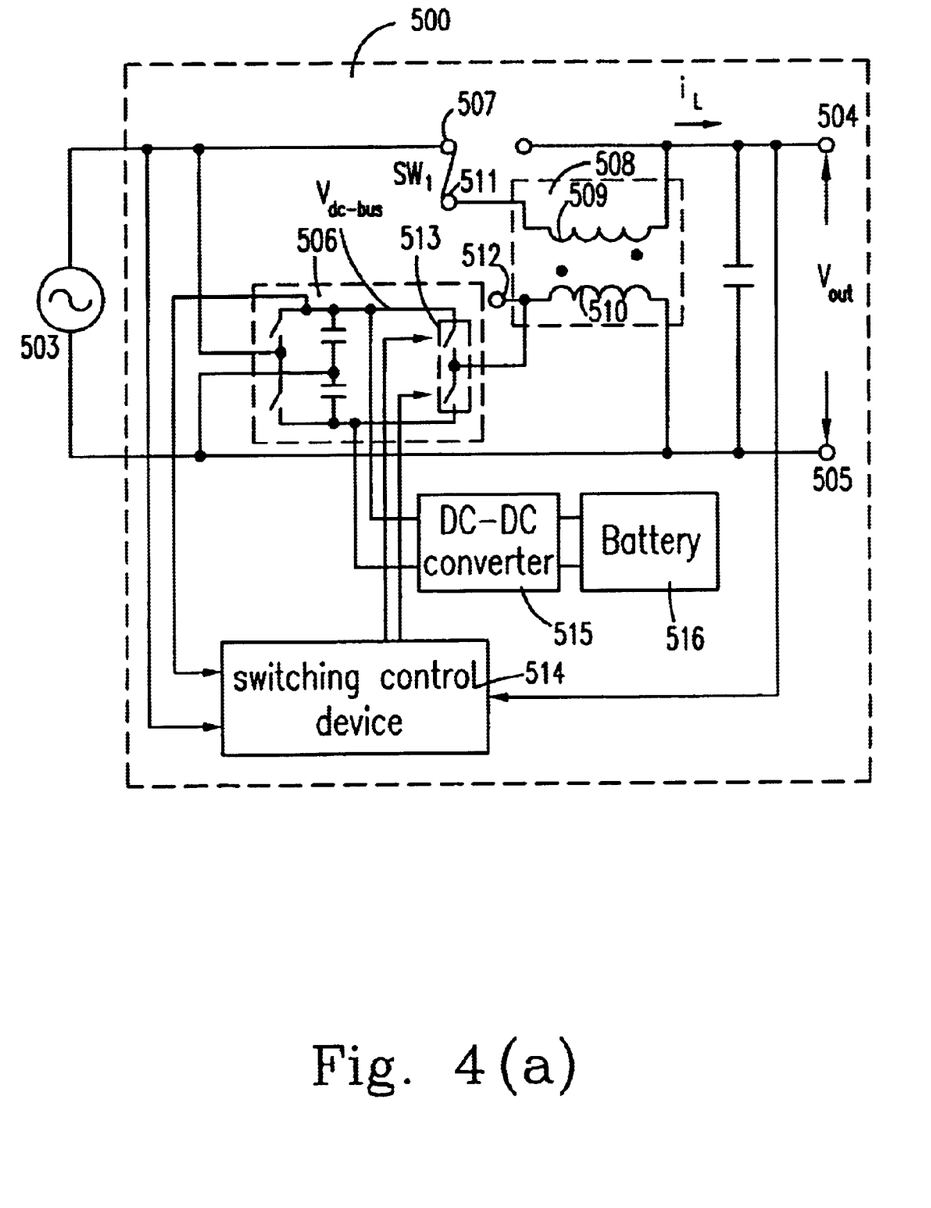
FIG. 4(a) is a schematic diagram illustrating an UPS when the input voltage is within a specific range according to a preferred embodiment of the present invention.
Figure 4B:
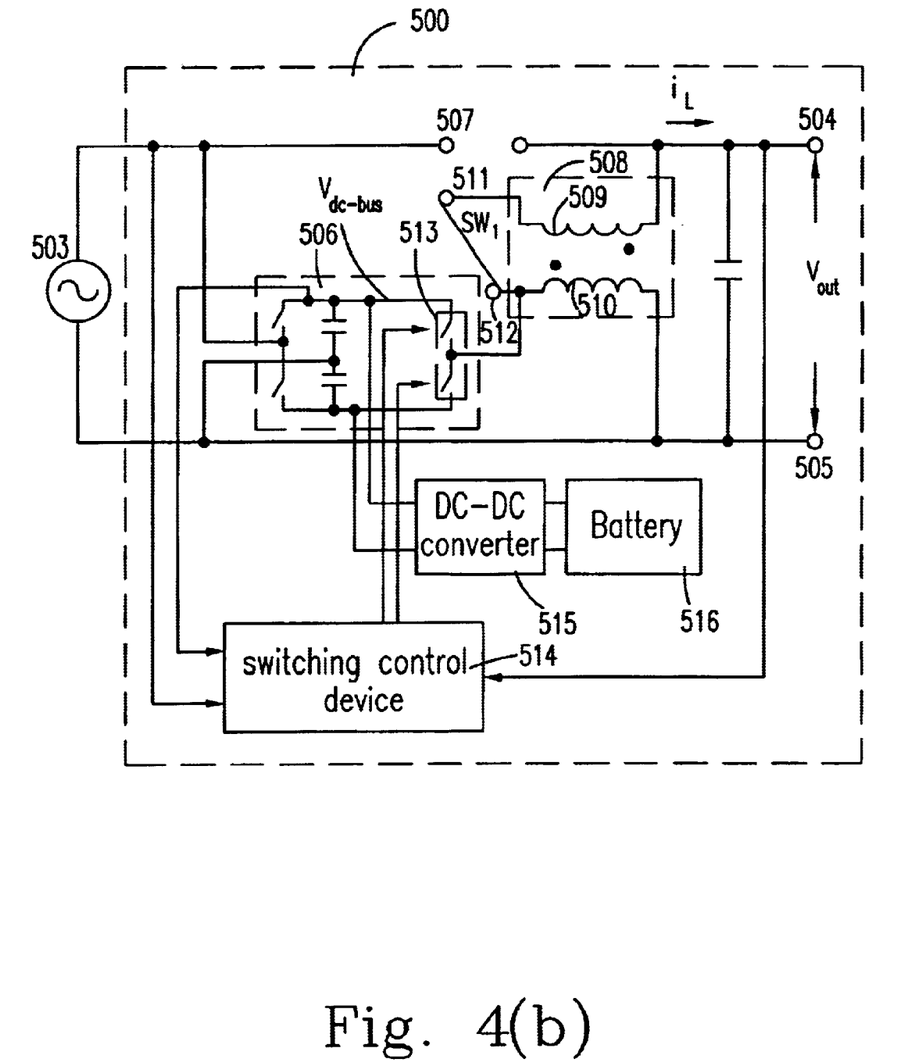
FIG. 4(b) is a schematic diagram illustrating the UPS when the input voltage is out of the specific range according to a preferred embodiment of the present invention.

Please refer to FIGS. 4(a) and 4(b). FIG. 4(a) is a schematic diagram illustrating an UPS when the input voltage is within a specific range according to a preferred embodiment of the present invention. As shown in FIG. 4(a), the major difference between FIG. 4 and FIG. 3 is that there exist a DC-DC converter 515 and a battery 516 employed in the electronic voltage regulator 500 in FIG. 4. Preferably, the electronic voltage regulator 500 can be an UPS in FIG. 4. For the architecture shown in FIG. 4, the DC-DC converter 515 is electrically connected to the DC voltage $V_{dc-bus}$ for providing a transformation of the DC voltage $V_{dc-bus}$. The electric energy of the DC voltage $V_{dc-bus}$ charges the battery 516 through the DC-DC converter 515 when the input voltage is within a specific range. Under this operation, the first terminal 507 of the switch $SW_1$ is directly connected to the second terminal 511 of the switch $SW_1$, thereby forming a conducting path through the first terminal 507 of the switch $SW_1$ to the second terminal 511 of the switch $SW_1$. At this time, the transformer 508 can be a variable voltage source to compensate the variation of the output voltage $V_{out}$. Even though the input voltage $V_{in}$ is varied, the transformer 508 can be a variable voltage source to compensate the variation of input voltage $V_{in}$ to stabilize the output voltage $V_{out}$. Consequently, the output voltage $V_{out}$ can be stabilized at a predetermined value, which is independent of the variation of the input voltage $V_{in}$ and the output voltage $V_{out}$.

However, the major characteristic of the present invention is to utilize the switching control device 514 to control the compensation voltage having a phase difference with the input voltage $V_{in}$ and keep the compensating power to be a positive value, wherein the compensating power is always drained from the power converter 506 via the transformer 508 to the load.

On the other hand, FIG. 4(b) is a schematic diagram illustrating the UPS when the input voltage is out of the specific range according to a preferred embodiment of the present invention. The second terminal 511 of the switch $SW_1$ is electrically connected to the third terminal 512 of the switch $SW_1$ to form a conducting path when the input voltage $V_{in}$ is out of the specific range. At the same time, the electric energy of the battery 516 is transformed to maintain the DC voltage $V_{dc\text{-}bus}$ at a predetermined value.

Please refer to FIGS. 3 and 4. The power converter further includes an output switch assembly 513 which is electrically connected to the DC voltage $V_{dc\text{-}bus}$ for converting the DC voltage $V_{dc\text{-}bus}$ to provide the compensation voltage to stabilize the output voltage $V_{out}$. In addition, the switching control device 514 obtains one group of voltages and one group of phases by feedback of the input voltage, the output voltage, and the DC voltage, thereby generating a pulse width modulation (PWM) signal through the output switch assembly 513 to stabilize the output voltage $V_{out}$.

Figure 5:
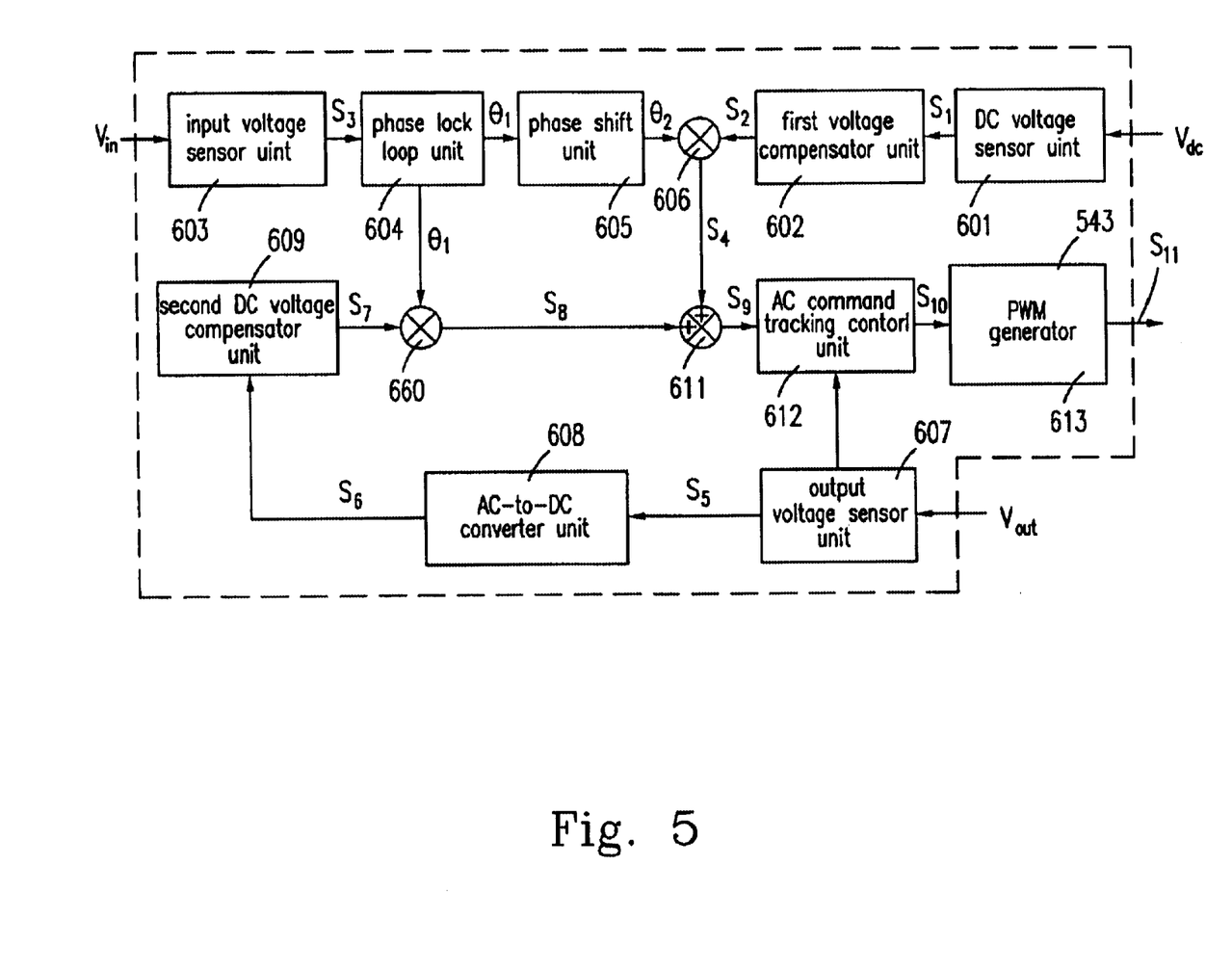
FIG. 5 is a block diagram illustrating the switching control device of the UPS according to a preferred embodiment of the present invention.

Please refer to FIG. 5. FIG. 5 is a block diagram illustrating the switching control device of the UPS according to a preferred embodiment of the present invention. As shown in FIG. 5, the switching control device 514 includes a DC voltage sensor unit 601, a first voltage compensator unit 602, an input voltage sensor unit 603, a phase lock loop unit 604, a phase shift unit 605, a multiplier unit 606, an output voltage sensor unit 607, a AC-to-DC converter unit 608, a second DC voltage compensator unit 609, a second multiplier unit 610, a adder unit 611, an AC command tracking control unit 612, a PWM generator 613. The DC voltage sensor unit 601 is electrically connected to the DC voltage for sensing the DC voltage to generate a first signal $S_1$ according to a magnitude of the DC voltage. The first voltage compensator unit 602 is electrically connected to the DC voltage sensor 601 for transforming the first signal $S_2$ to a second signal $S_2$. The input voltage sensor unit 603 is electrically connected to the power source for sensing the input voltage $V_{in}$ to generate a third signal $S_3$. The phase lock loop unit 604 is electrically connected to the input voltage sensor unit 603 for sensing a phase of the third signal $S_3$ to generate a first phase signal $\theta_1$. The phase shift unit 605 is electrically connected to the phase lock loop unit 604 for processing 90° phase shift of the first phase signal $\theta_1$ to generate a second phase signal $\theta_2$. The multiplier unit 606 is electrically connected to the an output terminal of the first voltage compensator unit 602 and the phase shift unit 605 for multiplying the second signal $S_2$ by the second phase signal $\theta_2$ to generate a fourth signal $S_4$. The output voltage sensor unit 607 is electrically connected to the output voltage $V_{out}$ for sensing the output voltage $V_{out}$ to generate a fifth signal $S_5$ having a magnitude and a phase. The AC-to-DC converter unit 608 is electrically connected to the output voltage sensor unit 607 for transforming the fifth signal $S_5$ to a sixth signal $S_6$ The second DC voltage compensator unit 609 is electrically connected to the AC-to-DC converter unit 608 for transforming the sixth signal $S_6$ to general a seventh signal $S_7$. The second multiplier unit 610 is electrically connected to the second DC voltage compensator unit 609 for multiplying the seventh signal $S_7$ by the first phase signal $\theta_1$ to generate an eighth signal $S_8$. The adder unit 611 is electrically connected to an output terminal of the first multiplier unit 606 and an output terminal of the second multiplier unit 610 for adding the fourth signal $S_4$ and the eighth signal $S_8$ to generate a command tracking signal $S_9$. The AC command tracking control unit 612 is electrically connected to an output terminal of the adder unit 611 and an output terminal of the output voltage sensor unit 607 to compare the command tracking signal $S_9$ with the fifth signal $S_5$ to generate a trigger signal $S_{10}$. And, the PWM generator 613 is electrically connected to the AC command tracking control unit 612 for transforming the trigger signal $S_{10}$ to a PWM signal $S_{11}$, thereby driving the output switch assembly to provide the compensation voltage to stabilize the output voltage $V_{out}$.

In conclusion, the following are some of the important advantages of the invention. (1) According to the design of the present invention, the present invention may reduce the voltage stress suspended at the primary transformer winding so as to save the required rating and volume of the transformer. This is can be further explained by the following numerical example. As concerned a system with the utility voltage of 120 volt and the ±20% of the utility voltage design range of the power electronic regulator, the voltage across the primary winding of the transformer is 24 volt, which is much less than input voltage level. (3) The present invention utilizes the high frequency switching technique to stabilize the output voltage, thereby increasing the precision of the output voltage regulation. (4) The present voltage regulator can be capable of an uninterruptible power supplier, thereby increasing the reliability of the system.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic voltage regulator, comprising:
    input terminals electrically connected to a power source which provides an input voltage;
    output terminals for providing a stable output voltage;
    a power converter electrically connected to said power source for generating a DC voltage, and having an output switch assembly electrically connected to said DC voltage for converting said DC voltage to generate a compensation voltage to compensate said output voltage when said output voltage is different from a predetermined value;
    a switch with a first terminal electrically connected to said power source;
    a transformer with a primary winding and a secondary winding, wherein a first terminal of said primary winding electrically connected to an output terminal of said power converter, a second terminal of said primary winding electrically connected to a second terminal of said output terminals, a first terminal of said secondary winding electrically connected to a first terminal of said output terminals, a second terminal of said secondary winding electrically connected to a second terminal of said switch, and a third terminal of said switch electrically connected to said first terminal of said primary winding; and
    a switching control device electrically connected to said power converter for controlling said power converter to stabilize said output voltage,
    wherein said switching control device obtains one group of voltages and one group of phases by feedback of said input voltage, said output voltage, and said DC voltage and thereby a pulse width modulation (PWM) signal is generated through said output switch assembly.

2. The electronic voltage regulator according to claim 1, wherein said power source is an AC power.

3. The electronic voltage regulator according to claim 1, wherein said electronic voltage regulator further comprises a DC-DC converter electrically connected to said DC voltage for providing a transformation of said DC voltage.

4. The electronic voltage regulator according to claim 3, wherein said electronic voltage regulator further comprises a energy storage device electrically connected to said DC-DC converter in which the electric energy of said DC voltage charges said energy storage device through said DC-DC converter when said input voltage is within a specific range, and the electric energy of said energy storage device is transformed to compensate said DC voltage when said input voltage is out of said specific range.

5. The electronic voltage regulator according to claim 4, wherein said energy storage device is a battery.

6. The electronic voltage regulator according to claim 5, wherein said electronic voltage regulator is an uninterruptible power supply (UPS).

7. The electronic voltage regulator according to claim 1, wherein said DC voltage is a DC-Bus voltage.

8. The electronic voltage regulator according to claim 1, wherein said transformer is a variable voltage source depending on a connection configuration of said switch.

9. The electronic voltage regulator according to claim 1, wherein said switching control device controls said compensation voltage having a phase difference with said input voltage and thereby cause a compensating power which is a product of said compensation voltage and an output current of said output terminals to be a positive value.

10. The electronic voltage regulator according to claim 8, wherein said connection configuration of said switch comprises:
a first connection configuration in which said second terminal of said switch is electrically connected to said first terminal of said switch to form a conducting path when said input voltage is within a specific range; and
a second connection configuration in which said second terminal of said switch is electrically connected to said third terminal of said switch to form a conducting path when said input voltage is out of said specific range.

11. The electronic voltage regulator according to claim 1, wherein said switching control device comprises:
a DC voltage sensor unit electrically connected to said DC voltage for sensing said DC voltage to generate a first signal according to a magnitude of said DC voltage;
a first voltage compensator unit electrically connected to said DC voltage sensor for transforming said first signal to a second signal;
an input voltage sensor unit electrically connected to said power source for sensing said input voltage to generate a third signal;
a phase lock loop unit electrically connected to said input voltage sensor unit for sensing a phase of said third signal to generate a first phase signal;
a phase shift unit electrically connected to said phase lock loop unit for processing 90° phase shift of said first phase signal to generate a second phase signal;
a multiplier unit electrically connected to said an output terminal of said first voltage compensator unit and said phase shift unit for multiplying said second signal by said second phase signal to generate a fourth signal;
an output voltage sensor unit electrically connected to said output voltage for sensing said output voltage to generate a fifth signal having a magnitude and a phase;
an AC-to-DC converter unit electrically connected to said output voltage sensor unit for transforming said fifth signal to a sixth signal;

a second DC voltage compensator unit electrically connected to said AC-to-DC converter unit for transforming said sixth signal to generate a seventh signal;
a second multiplier unit electrically connected to said second DC voltage compensator unit for multiplying said seventh signal by said first phase signal to generate an eighth signal;
an adder unit electrically connected to an output terminal of said first multiplier unit and an output terminal of said second multiplier unit for adding said fourth signal and said eighth signal to generate a command tracking signal;
an AC command tracking control unit electrically connected to an output terminal of said adder unit and an output terminal of said output voltage sensor unit to compare said command tracking signal with said fifth signal to generate a trigger signal; and
a PWM generator electrically connected to said AC command tracking control unit for transforming said trigger signal to a PWM signal, thereby driving said output switch assembly to provide said compensation voltage to stabilize said output voltage.

12. The electronic voltage regulator according to claim 11, wherein said first signal, said second signal, said third signal, said sixth signal, and said seventh signal are DC signals.

13. The electronic voltage regulator according to claim 11, wherein said fourth signal, said fifth signal, said eighth signal, and said command tracking signal are AC signals.

14. A control method applied to an electronic voltage regulator which comprises input terminals electrically connected to a power source for providing an input voltage, output terminals for providing a stable output voltage, a power converter electrically connected to said power source for generating a DC voltage, and having an output switch assembly electrically connected to said DC voltage for converting said DC voltage to generate a compensation voltage to compensate said output voltage when said output voltage is different from a predetermined value, a switch with a first terminal electrical connected to said power source, a transformer electrically connected between said power converter, said switch, and output terminals, and a switching control device electrically connected to said power converter for controlling said power converter, wherein said transformer is a variable voltage source depending on a connection configuration of said switch and said switching control device obtains one group of voltages and one group of phrases by feedback of said input voltage, said output voltage, and said DC voltage and thereby a pulse width modulation (PWM) signal is generated through said output switch assembly, comprising the steps of:
judging whether said output voltage is within a specific range;
determining a connection configuration of said switch;
generating said compensation voltage through said power converter and said transformer;
controlling said compensation voltage having a phase difference with said input voltage and thereby causing a compensating power which is a product of said compensation voltage and an output current of said output terminals to be a positive value;
utilizing said compensation voltage to stabilize said output voltage.

15. The control method according to claim 14, wherein said electronic voltage regulator further comprises a DC-DC converter electrically connected to said DC voltage for providing a transformation of said DC voltage.

16. The control method according to claim 15, wherein said electronic voltage regulator further comprises a energy storage device electrically connected to said DC-DC converter in which the electric energy of said DC voltage charges said energy storage device through said DC-DC converter when said input voltage is within a specific range, and the electric energy of said energy storage device is transformed to compensate said DC voltage when said input voltage is out of said specific range.

17. The control method according to claim 16, wherein said energy storage device is a battery.

18. The control method according to claim 17, wherein said electronic voltage regulator is an uninterruptible power supply (UPS).

19. The control method according to claim 18, wherein said connection configuration of said switch comprises:

a first connection configuration in which said second terminal of said switch is electrically connected to said first terminal of said switch to form a conducting path when said output voltage is within a specific range; and a second connection configuration in which said second terminal of said switch is electrically connected to said third terminal of said switch to form a conducting path when said output voltage is out of said specific range.

20. An electronic voltage regulator, comprising:

input terminals electrically connected to a power source which provides an input voltage;

output terminals for providing a stable output voltage;

a power converter electrically connected to said power source for generating a DC voltage, and having an output switch assembly electrically connected to said DC voltage for converting said DC voltage to generate a compensation voltage to compensate said input voltage when said input voltage is different from a predetermined value;

a switch with a first terminal electrically connected to said power source;

a transformer with a primary winding and a secondary winding, wherein a first terminal of said primary winding electrically connected to an output terminal of said power converter, a second terminal of said primary winding electrically connected to a second terminal of said output terminals, a first terminal of said second winding electrically connected to a first terminal of said output terminals, a second terminal of said secondary winding electrically connected to a second terminal of said switch, and a third terminal of said switch electrically connected to said first terminal of said primary winding; and a switching control device electrically connected to said power converter for controlling said power converter to stabilize said output voltage;

wherein said switching control device obtains one group of voltages and one group of phrases by feedback of said input voltage, said output voltage, and said DC voltage and thereby a pulse width modulation (PWM) signal is generated through said output switch assembly.

21. The electronic voltage regulator according to claim 20, wherein said electronic voltage regulator further comprises a DC-DC converter electrically connected to said DC voltage for providing a transformation of said DC voltage.

22. The electronic voltage regulator according to claim 21, wherein said electronic voltage regulator further comprises a energy storage device electrically connected to said DC-DC converter in which the electric energy of said DC voltage charges said energy storage device through said DC-DC converter when said input voltage is within a specific range, and the electric energy of said energy storage device is transformed to compensate said DC voltage when said input voltage is out of said specific range.

23. The electronic voltage regulator according to claim 22, wherein said energy storage device is a battery.

24. The electronic voltage regulator according to claim 23, wherein said electronic voltage regulator is an uninterruptible power supply (UPS).

25. The electronic voltage regulator according to claim 20, wherein said transformer is a variable voltage source depending on a connection confirmation of said switch.

26. The electronic voltage regulator according to claim 20, wherein said switching control device controls said compensation voltage having a phase difference with said input voltage and thereby cause a compensating power which is a product of said compensation voltage and an output current of said output terminals to be a positive value.

27. The electronic voltage regulator according to claim 25, wherein said connection configuration of said switch comprises:

a first connection configuration in which said second terminal of said switch is electrically connected to said first terminal of said switch to form a conducting path when said input voltage is within said specific range; and a second connection configuration in which said second terminal of said switch is electrically connected to said third terminal of said switch to form a conducting path when said input voltage is out of said specific range.

* * * * *